TWO-WAY LOUD-SPEAKER TELEPHONE INSTALLATION

Filed April 13, 1949 4 Sheets-Sheet 1

Pierre Jeanlin, Inventor
by Christy, Parmelee, & Strickland
his Attorneys

March 20, 1951 P. JEANLIN 2,545,467

TWO-WAY LOUD-SPEAKER TELEPHONE INSTALLATION

Filed April 13, 1949 4 Sheets-Sheet 2

Pierre Jeanlin, Inventor
by Christy, Parmelee, & Strickland
his Attorneys

March 20, 1951 P. JEANLIN 2,545,467

TWO-WAY LOUD-SPEAKER TELEPHONE INSTALLATION

Filed April 13, 1949 4 Sheets-Sheet 3

Pierre Jeanlin, Inventor
by Christy, Parmelee, & Strickland
his Attorneys

March 20, 1951 P. JEANLIN 2,545,467

TWO-WAY LOUD-SPEAKER TELEPHONE INSTALLATION

Filed April 13, 1949 4 Sheets-Sheet 4

Pierre Jeanlin, Inventor
by Christy, Parmelee, & Strickland
his Attorneys

Patented Mar. 20, 1951

2,545,467

UNITED STATES PATENT OFFICE 2,545,467

TWO-WAY LOUD-SPEAKER TELEPHONE INSTALLATION

Pierre Jeanlin, Paris, France, assignor to Societe Le Teleampliphone, Paris, France Application April 13, 1949, Serial No. 87,145
In France August 12, 1948

5 Claims. (Cl. 179—1)

In two-way loud speaker telephone installations using two amplifiers, the Larsen effect is generally eliminated by systems blocking one of the two amplifiers whilst the other works.

This result is nearly always obtained by polarizing beyond the "cut-off" one of the amplifier valves to be eliminated, the blocking polarization being itself obtained from the modulation amplified by the amplifier which works, and rectified.

This presumes that in the absence of conversation the two amplifiers are free, and consequently there is a risk of setting up the Larsen effect due to the reaction of one amplifier on the other through the intermediary of the microphones and loud speakers.

It is therefore necessary that the gain be reduced from the level capable of bringing about the setting up of the said effect. In practice, it is found that the power available for conversation with such a system is quite insufficient. It is therefore indispensable to introduce auxiliary circuits for reinforcing the audition at the moment when, one of the amplifiers being blocked, the other can work without fear of setting up the Larsen effect.

Different methods are resorted to which all use a variation of the polarization of the valves of variable gain, the said variation of polarization being obtained, for example, by the suppression of the plate current of the output valve blocked beyond the "cut-off" or by the blocking of a high frequency oscillator the rectified high frequency of which serves precisely for polarizing a valve of the amplifier in order to reduce the gain in the absence of modulation.

These methods, however, are imperfect or too complicated to permit of economical exploitation. In particular, the variations of polarization introduced on the grids of valves of high gain can cause disturbances which are partially eliminated by push-pull amplifiers of small economy. The obtaining of the polarization at the return of the anodic current demands careful filtrage in order to eliminate all trace of enlargement. For its part, this careful filtrage introduces time constants which are troublesome. The blocking of the amplifier by the output valve causes this to work in more or less linear parts of the characteristic curves, and distortions which are not negligible ensue and alter the fidelity of the reproduction. Finally, this method requires the employment of two distinct feeds, one for each amplifier, and also of important blocking tensions.

The object of the present invention is to eliminate all the aforesaid drawbacks.

In accordance with the invention, the blocking is no longer done by the output valve which can therefore work to stable characteristics with all the fidelity desirable. In the first mode of carrying out the invention, the blocking is done by the aid of a special valve and by a non-active electrode of this valve specially reserved for the purpose. In this manner, it is no longer necessary to provide a push-pull amplifier and there is no risk of mixing modulations of the two amplifiers, without complicated filters.

The over-amplification after blocking is no longer obtained by variations of grid polarization but by variation of cathode potential which gives the same practical result but requires very small current variations and no longer requires two anodic feeds. A great efficiency is thus obtained with very simple means. Moreover, the necessary blocking tension is small and this reduces the time constants for obtaining over-amplification.

In a second mode of carrying out the invention a slightly different principle is used giving analogous results with similar advantages but with means somewhat more complex. Instead of blocking an amplifier valve, the excitation of the loud speakers is acted upon through a power valve which is used to control the speaker excitation. The blocking tension is applied to the grid of the valve and the screen tension is stabilized in such manner as to give a more rapid disappearance of the plate current. When the plate current of the excitation valve is annulled, a more elevated tension appears on the plate. If the initial tension is, for example, 100 volts this becomes 200 volts upon the disappearance of the plate current by reason of the fall of tension which then disappears in the excitation winding. This important increase in tension arising from blocking is taken advantage of for obtaining an over-amplification effect. It suffices, for this purpose, to feed the preamplification valves and the screen of the power valve across the excitation winding to cause them to pass from a slight gain to an elevated gain.

The annexed drawings illustrate diagrammatically several examples of the aforesaid two modes of carrying out the invention.

Figure 1:
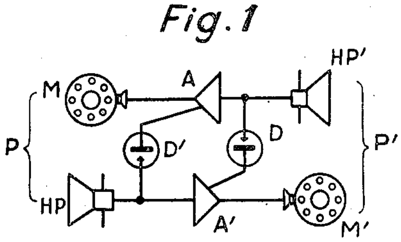
Figure 1 is a simplified diagram of a known telephonic installation wherein the amplifier of the line not used is blocked by the rectified amplified modulation coming from the amplifier of the line in use.

In Figure 1 the known installation comprises two stations P and P¹ connected together by two distinct lines each comprising a microphone and a loud speaker respectively M and HP and M¹ and HP¹. Between M and HP¹ and between M¹ and HP are interposed respective amplifiers A and A¹. When P speaks, the amplified modulation from A is rectified by D and serves for blocking A¹. Similarly, the modulation from A¹ rectified by D¹ blocks A when P¹ takes over the speech. The Larsen effect is thus avoided in a measure but such an installation has the drawbacks above referred to and to avoid these it is necessary to adopt an installation of the kind illustrated in Figures 2 to 5 or 6.

Figure 2:
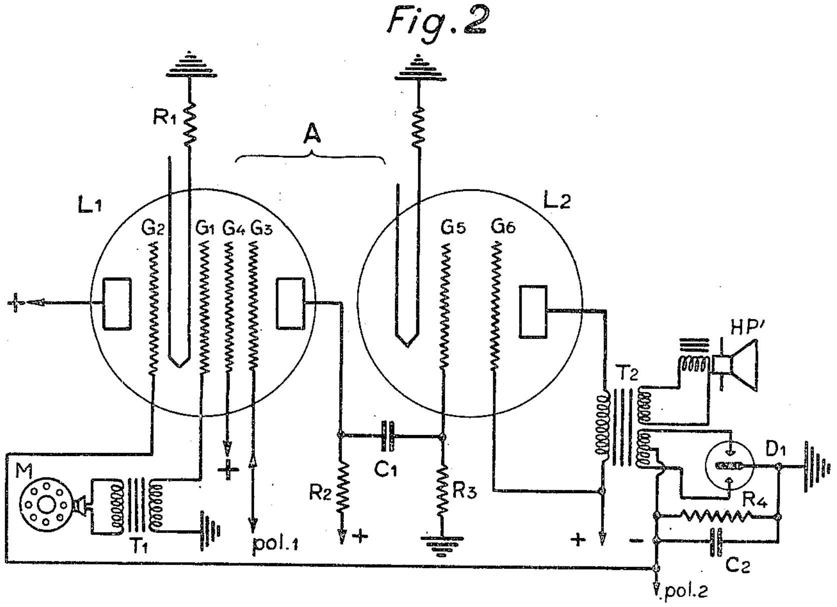
Figure 2 is a diagram of one line according to the first mode of carrying out the invention, the second line being identical therewith.

In Figure 2 only a single way or line is illustrated but it will be understood that the second line is identical therewith. Current from the microphone M is transmitted by the transformer T1 to the grid G1 of the first valve L1 of a two-valve amplifier L1L2. The valve L1 is a heptode comprising a triode element and a tri-grid element with a common cathode. The anode of the tri-grid element is connected by a condenser C1 uncoupled by two resistances R2 and R3 to the first grid G5 of the second valve L2 of the amplifier, which second valve is a tetrode with grid screen. The plate current from L2 feeds the primary of a three-winding transformer T2, one secondary of the latter feeding the loud speaker HP¹ of P¹ and the other secondary feeding a full wave rectifier D1. The negative tension produced by D1 is filtered by the condenser C2 in parallel with the resistance R4 and is transmitted on the one hand to the grid G2 of L1 and, on the other hand, to the grid in the second line corresponding to the grid G3 of valve L1, which grid, if the second line had been illustrated, would have been designated G¹3 and its valve L¹1. In Figure 2, the connection to the second line is indicated by the legend "pol. 2." The cathode of L1 is earthed through a resistance R1, whilst the grid G3 of the tri-grid element is fed by the negative tension coming from the rectifier (which would be D¹1) of the second line (that is to say coming from the amplified and rectified modulation produced when P¹ takes over the speech). The connection of G3 to the second line is indicated by "pol. 1" in Figure 2. The last grid G4 of L1 is a simple grid screen like G6 of L2.

The operation of the installation is as follows:

When P speaks, the current from M is transmitted by T1 to L1 which amplifies it, then to L2 which further amplifies, and passes to T2 which actuates the loud speaker HP¹. At the same time, however, the modulation from T2 is rectified by D1 and the negative impulse from D1 acquires the desired time constant at the same time that it is filtered by C2, R4. This negative tension applied to G¹3 of L¹1 is effective for blocking the amplifier A¹ of the second line for cutting off the current of the plate of L¹1. On the other hand, the same tension applied to G2 of L1 causes the anode current $I_1$ of the triode element to disappear. This current, which traverses the resistance of the cathode R1 common to the triode elements and tri-grid, gives at the start an important polarization to the tri-grid element which then amplifies very little. When the current $I_1$ disappears, there no longer remains the anode current $I_2$ of the tri-grid element to traverse R1 and the tri-grid element, little polarized, then amplifies strongly. There is thus obtained the desired over-amplification for the speech transmitted from P to P¹, at the same time that the amplifier A¹ of the non-utilized line between P¹ and P is put out of service. The two circuits are symmetric so that the operation is the same when P¹ takes over the speech and A is then put out of service.

The time constants given by C2 and R4 (or by C¹2 and R¹4 not shown) are such that between two words or two syllables the amplifiers recover their initial characteristics of small gain and permit the speakers to interrupt one another.

Figure 3:
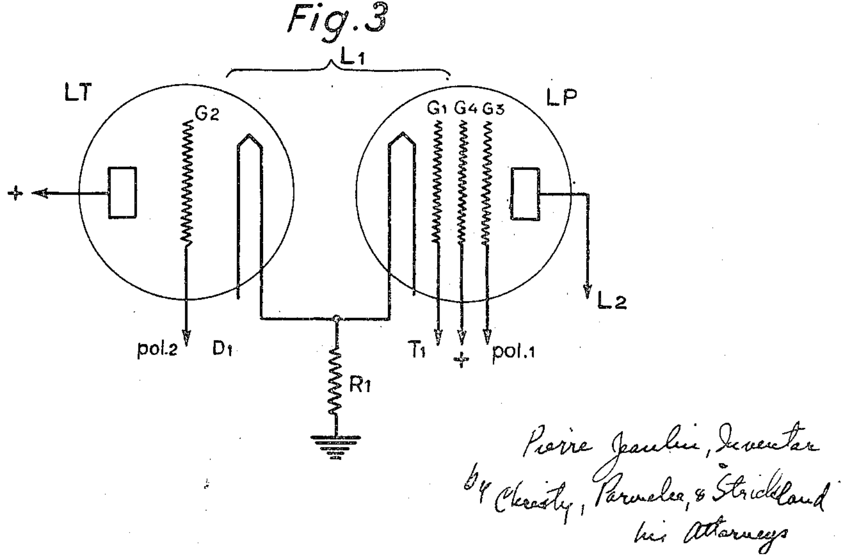
Figure 3 illustrates a variant in which the special valve is replaced by two valves of more standard type.

In Figure 2 a heptode of the type ECH21 is used as the valve L1. In Figure 3 a variant is shown wherein the said valve is replaced by a triode LT and a pentode LP, for example respectively of the types 6J3 and 6L7. The connections are the same, the two cathodes being earthed by a common resistance R1.

Figure 4:
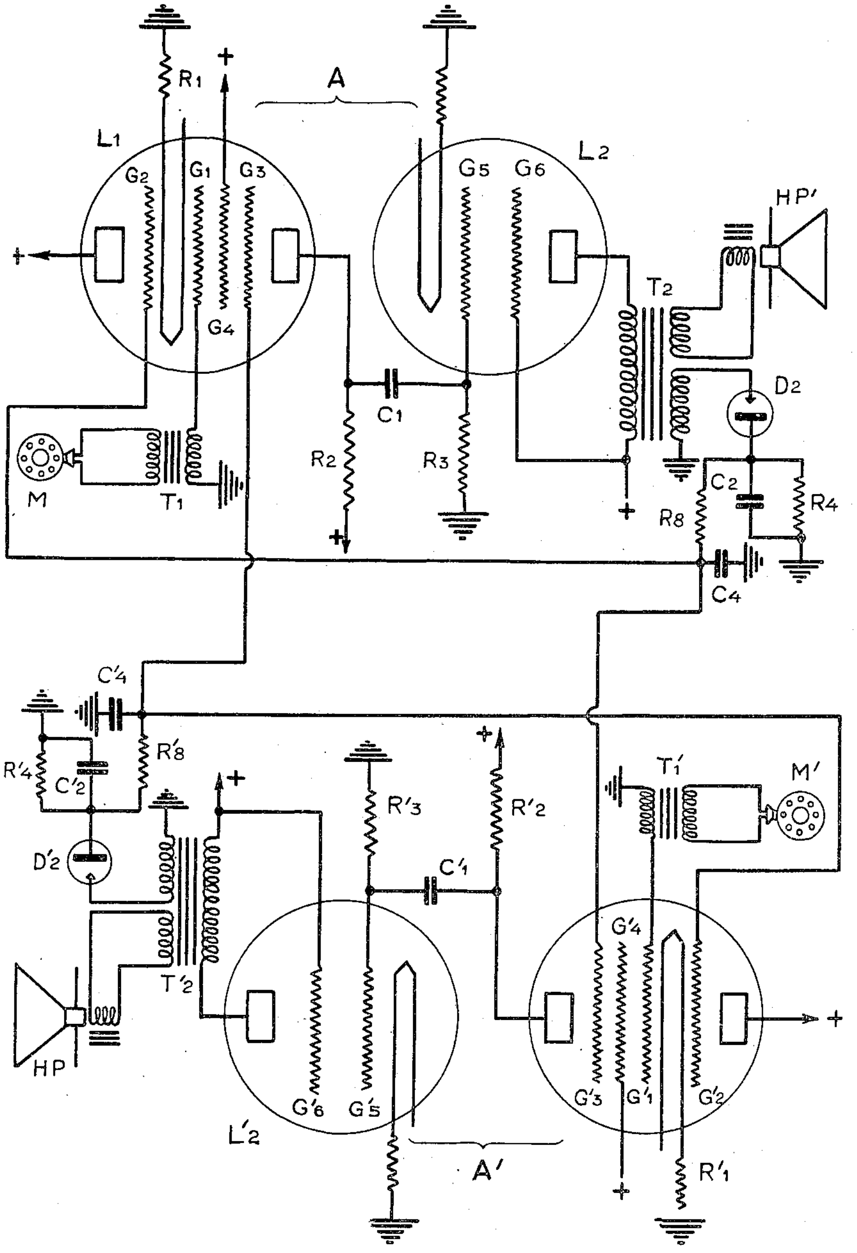
Figure 4 is a diagram of a complete assemblage.

In Figure 4 a two line installation is shown having the connections of Figure 2. In this case, however, there are two half wave rectifiers D2 and D¹2, and moreover the modulation rectified by D2 or D¹2, after traversing the filter C2, R4 or C¹2, R¹4, traverses a second filter C4, R8 or C¹4, R¹8 before reaching the grids G2 and G¹3 or G¹2 and G3. This second filter eliminates the alternative component which could remain after rectification.

Figure 5:
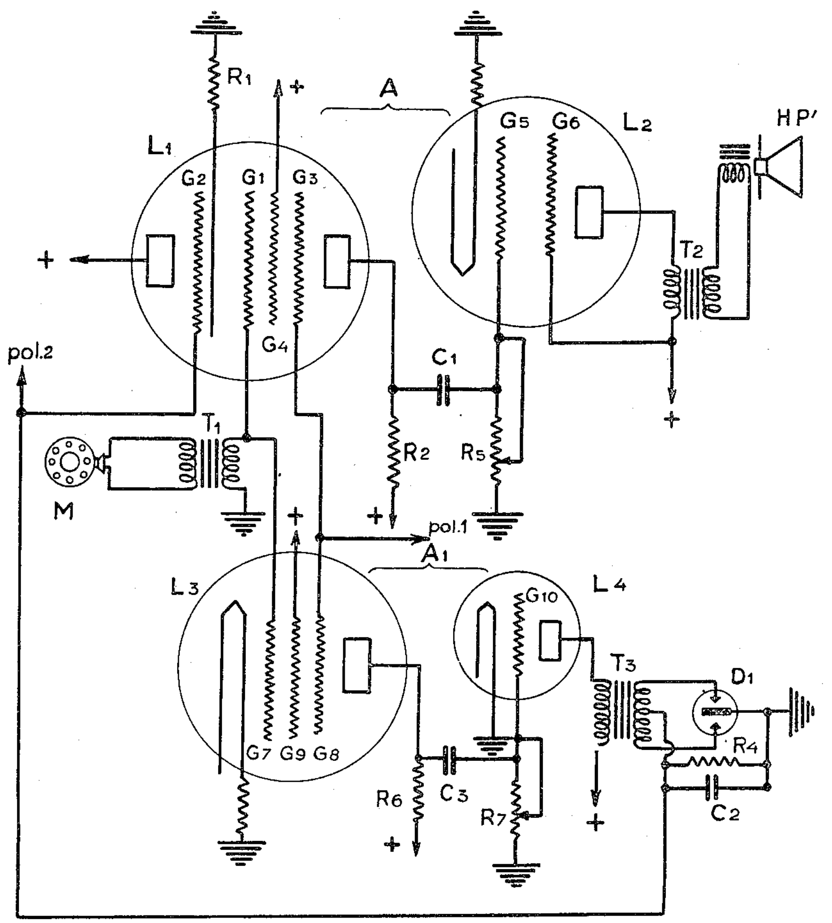
Figure 5 illustrates another variant in which the functions of amplification are separated from the modulation and amplification of rectification, thus permitting an independent regulation of the blocking circuit, which advantage is very important in practice when noises foreign to the conversation threaten to disturb the functioning of the apparatus.

In Figure 5 a variant is illustrated wherein recourse is had to a special amplifier A¹ the current of which is rectified by the rectifier D1, instead of taking the modulation at the outlet of T2.

The connections of the valves L1 and L2 is generally the same as before, but the resistance R3 is here replaced by a potentiometer R5. The amplifier A1 is composed of a pentode L3 and a triode L4. In this amplifier, the first grid G7 of the valve L3 is connected in shunt at the outlet of the secondary of the transformer T1, and the grid G3 of L1 is connected to the corresponding grid G8 of L3.

The plate current of L3 is transmitted, through the intermediary of a condenser C3 uncoupled by the resistance R6 and the potentiometer R7, to the grid G10 of L4. The anode current of L4 feeds the primary of a transformer T3 the secondary of which controls the rectifier D1 which transmits the rectified modulation on the one hand to G2 of L1 and on the other hand to G¹3 of L¹1 in the other line (indicated by "pol. 2" in Figure 5). The grid G9 of L3 is a simple grid-screen. Finally the valve L2 is connected to the loud speaker HP¹ through the transformer T2 as before.

In these conditions, the regulation of the power in the loud speaker HP¹ can be effected by the potentiometer R5, and the regulation of the blocking action is done by the potentiometer R7. The operation of the installation is the same as that in Figure 2. The amplifier $A^1$ can also be constituted by a valve identical to L1; the essential thing is that the gain of the system must be sufficient for procuring after rectification the necessary tension for blocking the principal amplifier of the line not used and for freeing the over-amplification in the line used. However, it should be noted that the grid G8 of L3 must obligatory be connected to G3 of L1; in effect, G8 serves to block L3 and if L3 were not blocked at the same time as L1, the modulation emitted by $HP^1$ and striking $M^1$ would arrive at $D^1 1$ which would have for effect to block the amplifier L1, L2 from the line in service.

Figure 6:
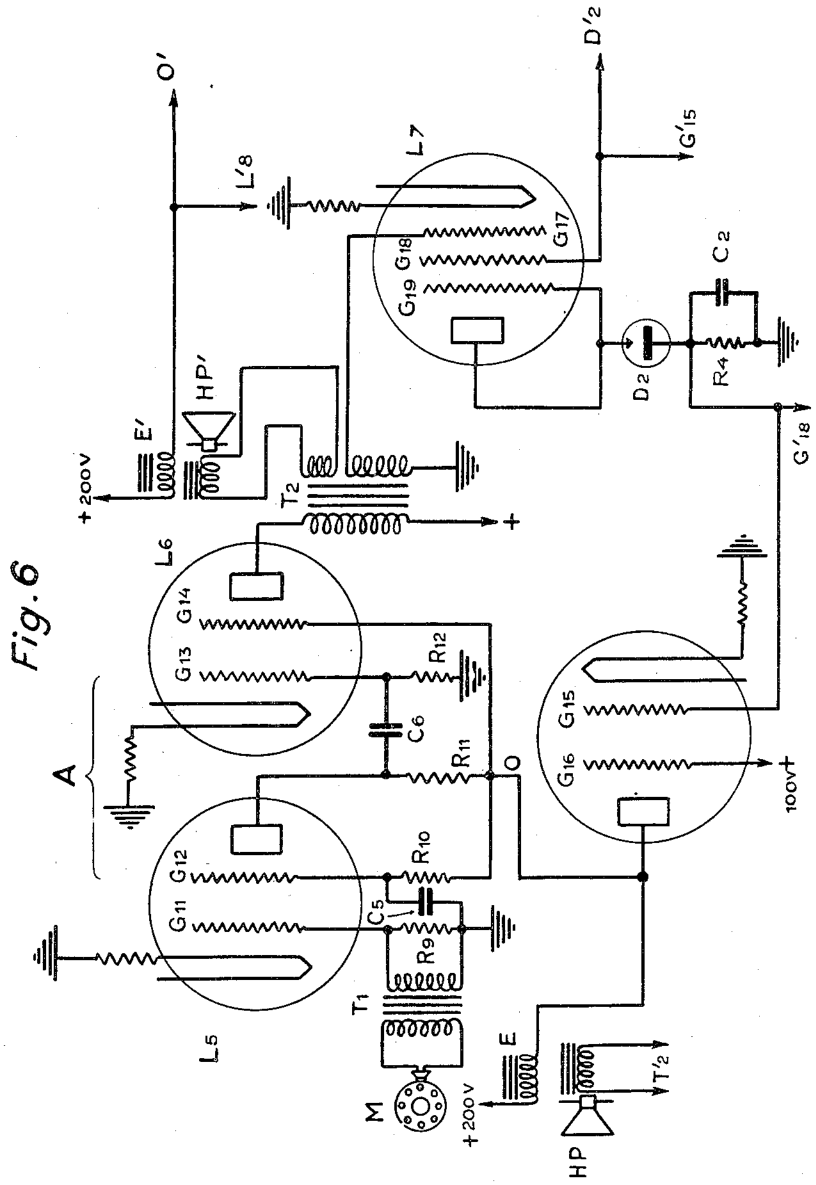
Figure 6 is a diagram of the second mode of carrying out the invention.

Figure 6 illustrates a second mode of carrying out the invention wherein that valve is blocked which controls the excitation of the loud speaker in the line not used. In this case the amplifiers A and A1 (valves L5, L6 and $L^1 5$, $L^1 6$) are of standard type. L5 and L6 are two bigrids. The secondary of the transformer T1 fed by the microphone M is connected to the first grid G11 and through the filter R9, C5 to the second grid G12 of L5. The grid G12 is connected through a resistance R10 to the anode circuit of L5 and the coupling between L5 and L6 is done by a condenser C6 and the resistances R11, R12 as in the case of the valves L1, L2. The anode current from L6 passes through the primary winding of a three-winding transformer T2 and one of the secondaries feeds the loud speaker $HP^1$. The other secondary feeds the rectifier D2 by way of a valve L7 which can be blocked by the same tension as that which blocks the valve $L^1 8$ (not shown) which is the exciter of the corresponding loud speaker. The valve L7 is a pentode, its first grid G17 being connected to a terminal of the transformer T2 and its second grid G18 being connected on the one hand to the outlet of the second rectifier $D^1 2$ (not shown) and on the other hand to the grid G15 of the valve $L^1 8$ aforesaid. The third grid G19 of L7 is a simple grid-screen. The modulation leaving the filter C2, R4 is transmitted on the one hand to the grid G15 of the valve L8 which controls the winding E which excites the loud speaker HP and on the other hand to the grid $G^1 18$ of the second line valve $L^1 7$ identical to the valve L7. L8 and $L^1 8$ are bigrids, the grid G16 or $G^1 16$ being simply a grid-screen. The anode current from L8 is transmitted on the one hand to the winding E and on the other hand to the point O to which are also connected the grid G12 and the anode of L5 and the grid G14 of L6. The winding E is connected to the general high tension feed + 200 v. as also is the winding $E^1$ exciting $HP^1$. This latter winding is connected on the one hand to the point $O^1$ corresponding to O and on the other hand to the anode of the valve $L^1 8$. These different valves and connections have not been shown in order to simplify the drawing.

This installation operates as follows:

If a person at P speaks into M, the amplifier A, at the same time that it feeds $HP^1$, gives (as in Figures 1 and 2) a derivation towards D2 which procures the blocking tension. This tension is applied to the grid G15 of L8 so that when M speaks L8 is blocked to the cut-off and the excitation current of HP disappears. HP should then be mute. At the same time that the fall of tension in the excitation winding disappears (it is about 100 volts in practice) the corresponding tension at O passes from 100 to about 200 volts and this increase in tension applied to the grids G12 and G14 and to the anode of L5 in the amplifier at work procures the desired over amplification.

The valve L7 should be able to be blocked at the same time as $HP^1$ in order to avoid that the modulation reaching D2 blocks the amplifier A in service. That is why L7 is connected to L8 which assures the blocking of the excitation of $HP^1$.

Further, the same results should be obtained by shunting L7 and D2 upon L5 and not upon L6, thereby using a connection analogous to that of Figure 5.

Of course it would also be possible to use a full-wave rectifier D1 or $D^1 1$ instead of a half wave rectifier D2 or $D^1 2$, the connections being then the same as in Figures 2 and 5.

The two lines being symmetrical, the operation is the same when $P^1$ takes over the speech.

As in the first mode of carrying out the invention, the time constants of the circuits should be chosen so as to permit the speakers to interrupt one another.

I claim:

1. A two-way loud speaker installation comprising a pair of transmission lines respectively including a loud speaker, a microphone, and a circuit connecting said microphone to said loudspeaker, said circuit having an amplifying means therein comprising a first grid including means coupled to said microphone for modulating the output of said amplifying means, means including a second grid operable upon energization thereof for increasing the gain of said amplifying means, and means including a third grid operable upon energization thereof for biasing said amplifying means to cut-off, and a control means including a rectifier for generating a biasing control voltage in response to modulation of said amplifying means by said first grid, and circuits interconnecting each of said lines with the other including means for applying the control voltage generated by the control means in either of said lines to the first grid in such line and to the third grid in the other of said lines.

2. A two-way loud speaker telephone installation comprising a pair of lines respectively having a microphone, a first transformer having energizing means connecting it to said microphone, an amplifier including a modulation grid having means connecting it with said transformer, means including a blocking grid operable upon energization for rendering the amplifier inoperative, and means including an over-amplification grid operable upon energization to increase the gain of the amplifier, a second transformer having means connecting it to the output of the amplifier, a loud speaker connected to said second transformer for operation thereby, and control means including a rectifier for producing a biasing control voltage in response to operation of said amplifier, and circuit means interconnecting said lines for applying the biasing control voltage from the control means in either of said lines to the over-amplification grid in such line and to the blocking grid of the other line.

3. A two-way loud speaker telephone installation comprising a pair of lines respectively having a microphone, a first transformer having energizing means connecting it to said microphone, means connected with said first transformer for amplifying signals to be transmitted comprising an electronic valve having an output circuit, a first control grid including means connected to said transformer for controlling the energization of said output circuit, a second grid operable upon energization thereof for biasing said valve to cut-off, and third grid operable upon energization thereof for increasing the gain of said valve, a second stage of amplification having a control grid including means connecting it to said output circuit, a loud speaker having transformer means connecting it to said second stage for operation thereby, and means including a rectifier for producing a biasing control voltage in response to the transmission of signals over the line in which it is located, and a control circuit interconnecting said lines and including means for applying the biasing control voltage produced in either of said lines to the third grid in the line producing such voltage and to the second grid in the other of said lines.

4. A two-way loud speaker telephone installation comprising a pair of lines respectively having a microphone, a first transformer having energizing means connecting it to said microphone, amplifying means comprising a triode having a control grid, an electronic valve having first and second control grids, and a common cathode circuit means for said triode and valve, energizing means for said valve including a connection for said first control grid with said transformer, an output circuit having energizing means connected to said valve and a second transformer energized by said output circuit, a loud speaker having an energizing circuit connecting it with said second transformer, and control means including a rectifier for producing a biasing control voltage in response to the transmission of signals over the line in which it is located, and circuit means interconnecting said lines for applying the biasing control voltage produced by the control means in either of said lines to the triode control grid in such line and to the second control grid of the electronic valve in the other of said lines.

5. A two-way loud speaker installation comprising a pair of transmission lines respectively having an amplifying means therein, each of said amplifying means including a control means operative in response to the reception of a signal to be transmitted for operating it to amplify such signal, a regulating means operable upon energization to increase its gain, and a blocking means operable upon energization to render it inoperative to amplify, each of said lines further having means responsive to operation of its amplifying means by its control means for producing a biasing control voltage, and circuit means interconnecting said lines for applying the biasing control voltage produced in either of said lines to the regulating means in such line and to the blocking means in the other of said lines.

PIERRE JEANLIN.

REFERENCES CITED

The following references are of record in the file of this patent:

UNITED STATES PATENTS

| Number | Name | Date |
|---|---|---|
| 1,977,469 | Bussard | Oct. 16, 1934 |
| 2,236,645 | Levy | Apr. 1, 1941 |
| 2,336,888 | Reier | Dec. 14, 1943 |

FOREIGN PATENTS

| Number | Country | Date |
|---|---|---|
| 803,389 | France | Sept. 29, 1936 |